Figure 2:
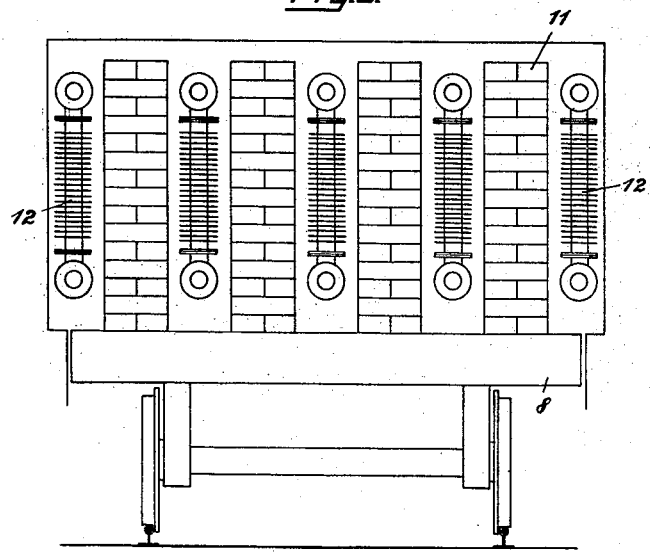

Aug. 22, 1944.                W. AVENHAUS                2,356,496
METHOD AND APPARATUS FOR THE PRODUCTION OF CERAMIC
        SHAPED BODIES, ESPECIALLY CLAY TILES
              Filed Sept. 24, 1940            9 Sheets-Sheet 1
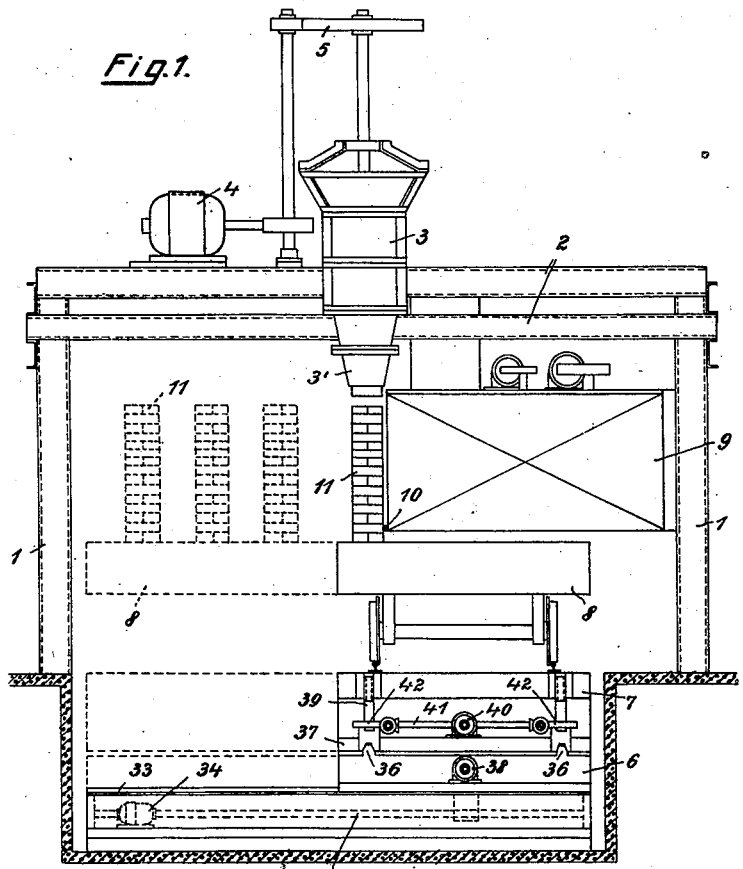
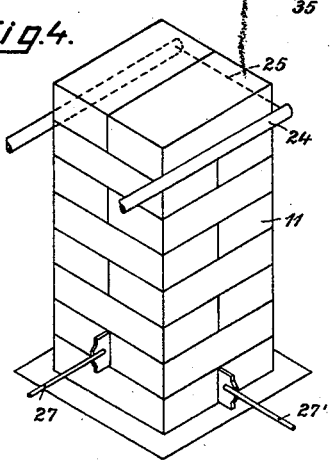
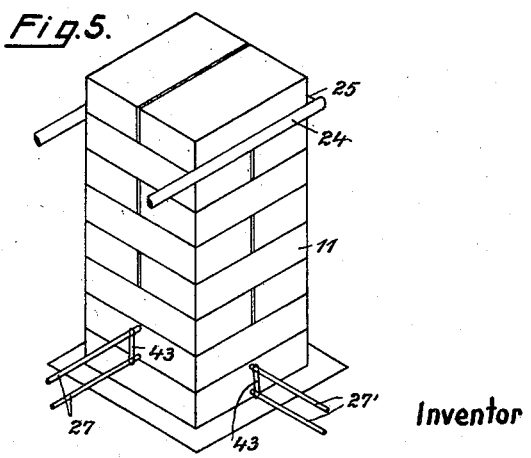
Inventor
W. Avenhaus
By Stevens and Davis
Attorneys Inventor
W. Avenhaus
By Sterne and Davis
Attorneys

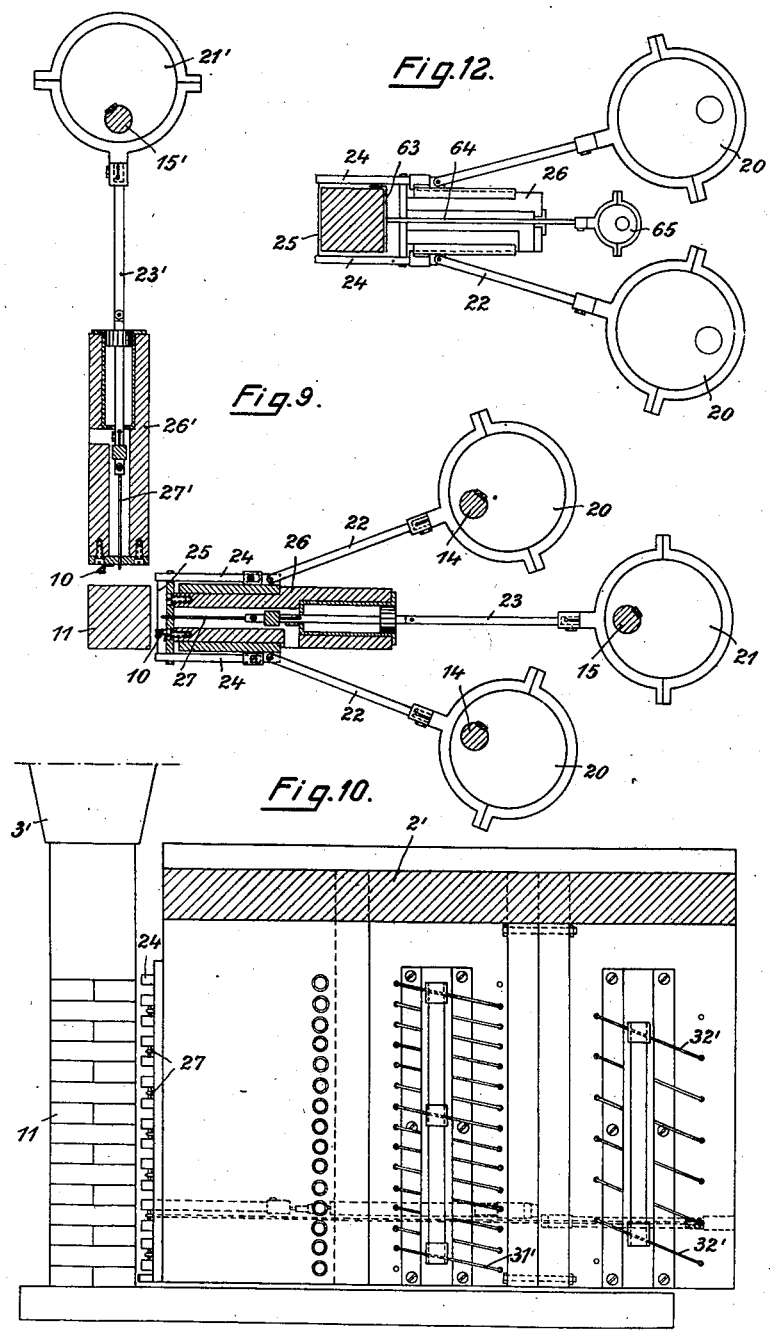

Aug. 22, 1944. W. AVENHAUS 2,356,496
METHOD AND APPARATUS FOR THE PRODUCTION OF CERAMIC
SHAPED BODIES, ESPECIALLY CLAY TILES
Filed Sept. 24, 1940 9 Sheets-Sheet 6
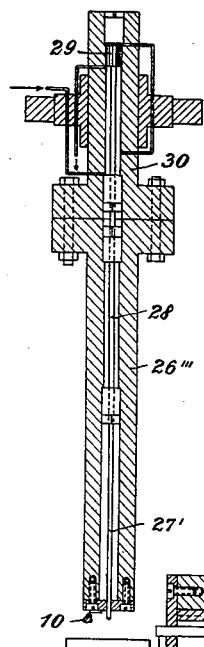
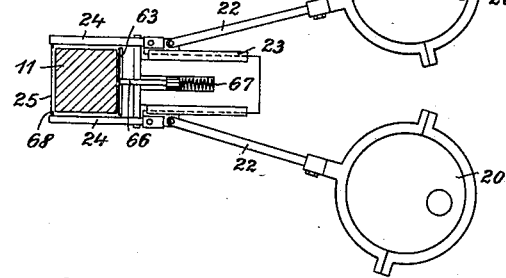
Fig.13.
Fig.11.
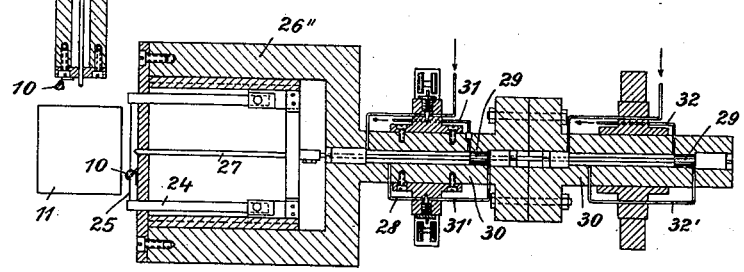
Fig.16. Fig.16a.
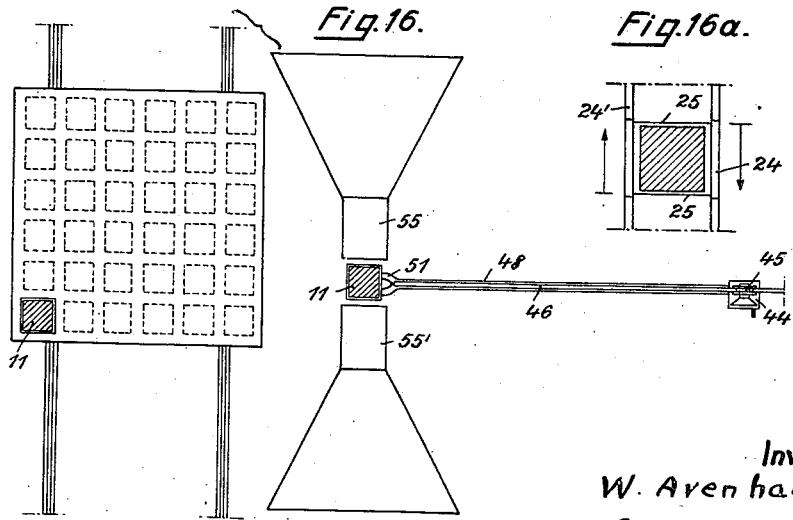
Inventor
W. Avenhaus
By
Attorneys

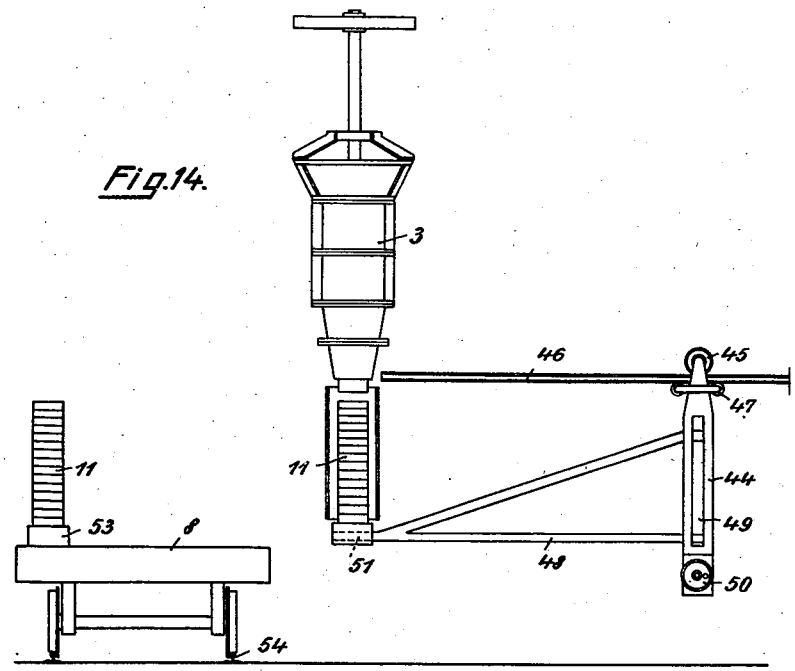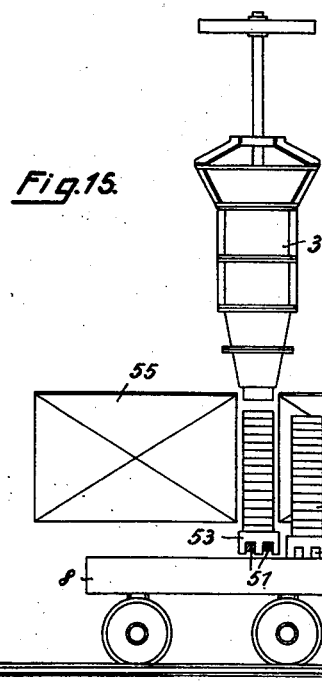

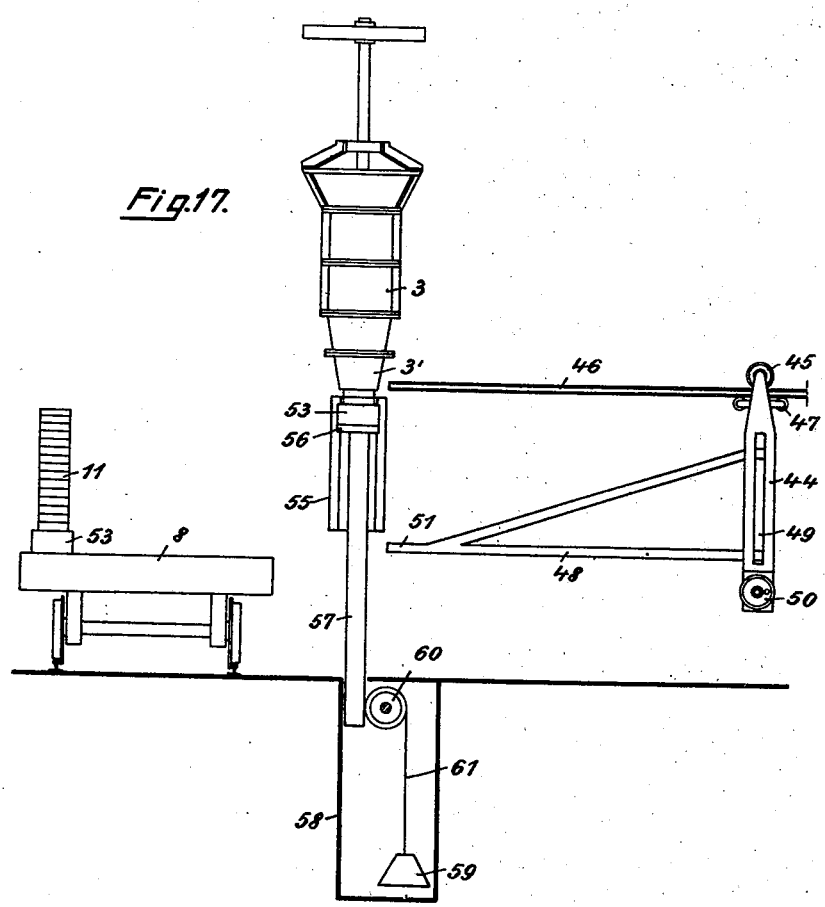

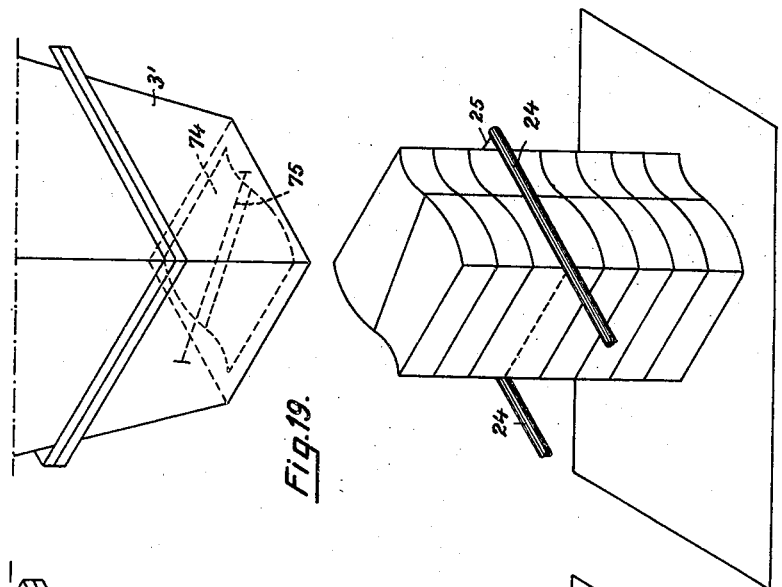
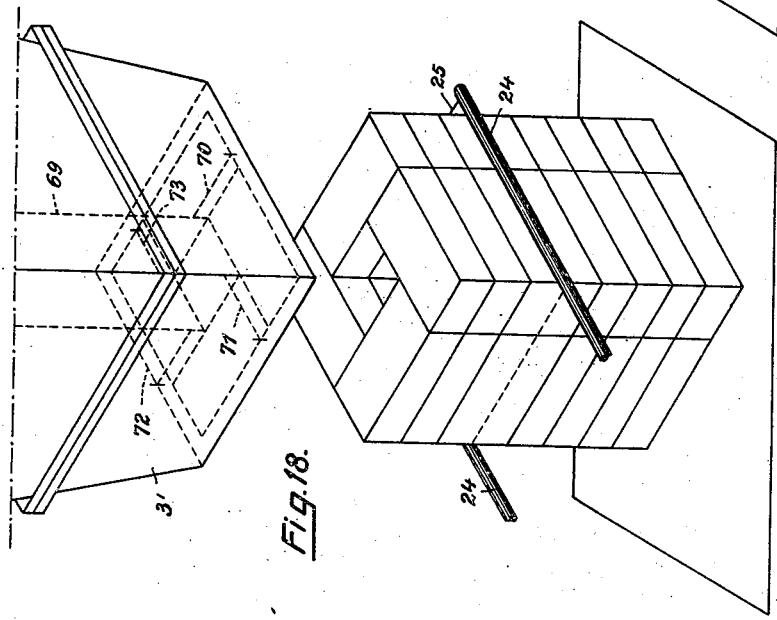

Patented Aug. 22, 1944

2,356,496

UNITED STATES PATENT OFFICE 2,356,496

METHOD AND APPARATUS FOR THE PRODUCTION OF CERAMIC SHAPED BODIES, ESPECIALLY CLAY TILES

Wilhelm Avenhaus, Zwickau, Germany; vested in the Alien Property Custodian

Application September 24, 1940, Serial No. 358,175
In Germany October 5, 1939

8 Claims. (Cl. 25—11)

In the production of prismatic ceramic shaped bodies, especially tiles, from a clay transformed into string-shape by means of a worm press, it is necessary to repeatedly replace onto the conveying devices the shaped bodies cut on the press and from these conveying devices onto the support on which they are dried and burnt.

The invention has for its object, compared with this method, a fully automatic production of prismatic ceramic shaped bodies, especially of clay tiles or clinkers, so that the shaped bodies during the whole operation need not be touched by hand and especially the difficult operations in the kiln such as inserting and removing by hand are avoided. A considerable portion of the work to be done by men is thus saved. According to the invention the clay string discharged from the string press of known type is subdivided into a great number of prisms, the individual prisms being, however, not separated the one from the other, but the string is removed as a whole from the remainder of the string in the mouthpiece of the press and dried in the air or in a drying apparatus and then burnt. The separating of the cut shaped bodies behind the press, which is necessary according to the known method, is therefore not necessary any more.

The work is carried out preferably by means of an upright press, from which the string is discharged in downward direction. The operation is such, that the clay string is lowered until it comes to sit upon a supporting plate adapted to be transported. The feeding movement is then interrupted, the clay string cut in vertical and horizontal direction or in both directions and separated from the mouthpiece of the press, without, however, separating the one from the other the individual shaped bodies, the supporting plate being lowered for this purpose if necessary. The supporting plate is then moved in horizontal direction. A free portion of the same supporting plate or a fresh supporting plate is then lifted into the receiving position, and the pressing proceeding begins again. The feeding movement of the clay string from the press can be controlled automatically in that, at the side of the clay string, an electric eye is arranged, for instance just above the supporting plate destined to receive the string. The electric eye then stops, through the intermediary of a relay or the like, the drive of the string press. The electric eye may serve at the same time for engaging the drive of the automatic cutting devices.

The manner of operation may, however, be also conducted so that the supporting plate is in the lowered position when the pressing proceeding begins and lifted only after the hanging string has been pushed forward up to the electric eye and the press has been stopped.

As supporting plate for the clay strings serves in one form of construction a kiln car, such as can be used for a tunnel- or channel kiln. This car rests during the lading on a track bed which can be moved by a motor, respectively shifted in longitudinal and transverse direction. Instead of a kiln car any other plane support of wood, metal, chamotte or the like may be used, which, if desired, is placed in charged state onto a lifting car and then travels through the drying and burning kiln.

The staples of shaped bodies can then be replaced by means of a mechanical gripping apparatus or put aside as store. Several clay strings or brick staples are at first placed on the kiln car the one behind the other in a longitudinal row, intervening spaces being left free. When the first row is completed, the longitudinal bed with the track bed and kiln car is shifted in lateral direction by the width of a string and of an intervening space. The longitudinal bed together with the kiln car is further run back by the length of one row of staples, so that the pressing and setting down of the second row of staples can begin.

The driving engines of the lifting mechanism for the track bed, the longitudinal bed, the transverse bed, the worm press and the cutting implements are operated in a certain succession so that, when one machine is stopped, the next machine is started with the aid of a contacting or breaking contact. The direction of rotation of the individual electric driving engines can alter as required and be regulated by reversing keys.

By suitable dimensioning the mouthpiece of the press, a cross-section is given to the clay string which amounts to a simple or to a multiple, preferably the double of a tile face. In front of the mouthpiece a cutting wire may be arranged which cuts the discharged string into two halves, each half having for the production of normal tiles a cross-section of, for instance, 25.12 cm. plus the amount of the contracting by drying and burning. The cutting device arranged at the side has then to carry out merely the horizontal cuts. Instead of the stretched wire, a rib up to 2 cm. width may be arranged in front of the mouthpiece, so that the intervening space produced thereby between the two individual strings allows drying air or heating gases to flow through. In order to securely prevent spacing of the two string halves at the upper end, a cap, a clamp or an angular frame of the cross-sectional shape of the string may be placed over the vertically divided string.

The difficulty mentioned, i. e. that a string subdivided in the longitudinal direction has the tendency to gape when it is lowered onto the supporting plate, can be overcome in a very simple manner merely by an arrangement of the cutting devices. According to the invention the cutting devices producing the longitudinal cut are placed in the interior of the mouthpiece, preferably at a distance of a few millimeters up to a few centimeters from the discharge edge of the mouthpiece.

In a preferred form of construction a cutting wire is stretched parallel to a side face of the mouthpiece at a distance of about 0.5 to 1 cm. from the discharge edge.

Two opposite walls of the mouthpiece are, for instance, bored at 5 mm. behind the discharge edge at the middle, and a cutting wire in stretched state is welded or soldered into these bores.

The string discharged from a mouthpiece thus prepared is, seen from the outer side, absolutely uniform. Only at some points a thin middle line is visible on its surface, but the string halves do not gape. On the other hand, no intimate connection between the two halves has occurred, as, if they are gripped at the freely hanging string end, these halves can be pulled asunder with little expense of force. The farther the wire has been placed back in the mouthpiece or, in an upright press, in upward direction, the stronger the two string halves will stick again the one on the other. Care has evidently to be taken that this connection does not become too intimate and that the string halves cannot be united again within the mouthpiece to one body.

It is advisable, in order that disturbances can be noticed or removed immediately, not to rigidly fix the cutting wire at both ends, but to insert and tighten the same with a stretching device, so that it can be seen on the outer side of the mouthpiece whether the tension changes or the wire breaks. If desired, the stretching device or the wire may be equipped with an alarm device at the operation of which the wire has to be replaced.

The tiles can, however, also be cut in the bond in such a manner that first in the continuous string the continuing horizontal cuts are made and then the vertical cuts from the one side, whereupon from the other side the remaining vertical cuts are made.

If the clay is of tough or dry consistency, it is possible without any difficulty to produce strings of a height up to 15 normal tiles or more and to cut them without any alteration of the string contour during the whole working process.

If the pressing has to be carried out on comparatively soft clay, the implements consisting of cutting frames can first be run out, so that the clay string passes at the pressing through the run out horizontal cutters. If the string has then been set on the support, a supporting plate arranged in front of the cutting device and having inlet grooves for the cutting wires is shifted slightly towards the clay string and bolted in this position. During the pulling back the horizontal cutters press the string against the supporting plate and produce the horizontal cuts. The cutting frames are only then run out again when the cut staple is conveyed and a fresh free face is below the string mouthpiece.

As cutting implements cutting frames moved by hand which produce cuts singly or groupwise may be used if they are positively guided and their stroke is limited. Automatically operating cutting implements may, however, also be used which are driven mechanically, for instance by cranks or eccentrics, or pneumatically or hydraulically. The cutting implements may be actuated also by magnets with lever control or also by weight-loaded pull ropes, in which the weight controls the stroke of the implements in the one direction, whereas the movement in the other direction is produced by an electromotor which raises the weights again into their initial position.

For the transverse and longitudinal bed for the shifting of the car several juxtaposed rails may be substituted, for instance in small works, in front of which rails a sliding platform extends. The support can then be moved by hand or with the aid of a push rod, screw spindle or the like and lifted by means of a lifting car. The whole plant may, however, be absolutely automatic in that by electric means after stopping of the string press the support is moved by a lifting motor into the receiving position, whereupon the cutting implements are engaged and disengaged successively, the support is lowered and the longitudinal bed shifted by the desired distance or, after a full row of staples has been put on, also the transverse bed is shifted.

The clay string discharged from the press may, however, be removed from the support, on which it rests during the cutting, by means of a setting implement and transferred upon a support adapted to be run in the horizontal plane in two directions and adapted to accommodate a great number of clay strings. This support, for instance the plate carriage, need no longer be liftable and lowerable, and the bed for the lifting and lowering device may be of much smaller dimension, as it serves merely for moving the actually cut string.

For instance, the clay string, during the pressing out, is deposited onto a supporting plate, on which it rests during the cutting and which, after the cutting, is gripped by the setting implement and transferred with the cut string onto a horizontal support adapted to be shifted, for instance onto a plate-car. In some cases, for instance for certain kinds of clay, it is advisable to lift the supporting plate to in front of the mouthpiece of the press by means of a vertically movable table prior to the pressing out, and to lower the supporting plate during the pressing, whereupon the string is cut, the supporting plate gripped by the setting implement, the table lowered, and the supporting plate with the cut string run out.

The depositing device gripping the supporting plate is preferably carried, movable in vertical and horizontal direction, by a trolley or a support. The supporting plate, which consists preferably of a refractory material such as chamotte, has two or more grooves in which engage the shiftable fingers of the depositing device.

In this form of construction a cutting tool, cutting on two sides, may be used. Laterally relative to the direction of movement two cutting devices are arranged which work the one against the other, one of which cuts the horizontal cuts with even number and the other the horizontal cuts with odd number. The cutting device, which is on the left hand side of the track of the depositing device, cuts therefore the first, third and fifth cut and so forth, whereas the cutting device arranged at the right hand side of the track cuts the second, fourth, sixth cut and so forth. When the two cutting devices operate simultaneously, bending of the vertical string in lateral direction under the action of the pressure of the cutting wires is avoided.

At the beginning of the pressing out of one staple the cutting arms of both cutting devices are actually swung out, the depositing implement has been run back so far, that both fingers of the jib of the depositing device are at a distance underneath the mouthpiece which corresponds almost to the height of the string or staple to be pressed out. The supporting plate of chamotte or other material is placed on the fingers. The cutting wires and cutting arms enclose a four-sided space into which from above downwards the string discharged from the mouthpiece of the press is pressed.

In the drying channels and tunnel kilns the heating elements, for instance in the drying channel ribbed pipes through which hot steam flows and in the burning kiln gas pipes hanging down from the ceiling, are arranged spaced the one from the other parallel to the direction of movement so that the staples standing on the plate car are pushed in between the heating elements.

By the arrangement according to the invention it is possible to produce, in the drying chamber as well as in the tunnel kiln, a perfect counter current movement and drying and burning absolutely uniformly over the cross-section of the channel.

The pressed shaped bodies can be preliminarily dried in the open air. It is possible, to carry out at any time successively a natural and an artificial drying. The amount of heat used for the drying can therefore be reduced considerably. The hanging gas pipes in the burning kiln, especially in the channel kiln, may be made of chamotte, corundum or heat-proof steels, so that the lower end is open and flue dust can be ejected in downward direction when the pipes are being cleaned. The gas pipes can further be constructed so that they can be pushed out from the kiln in downward direction. The gas pipes can further be pulled out of the kiln in upward direction and constructed exchangeable.

To prevent sticking or baking-on of the lowermost tiles on the support during the pressing, sand or the like may be strewn on the car or paraffin paper, ordinary wrapping paper, or undulated cardboard may be placed on the car.

In the accompanying drawings an apparatus suitable for carrying out the method is illustrated by way of example.

Figure 2A:
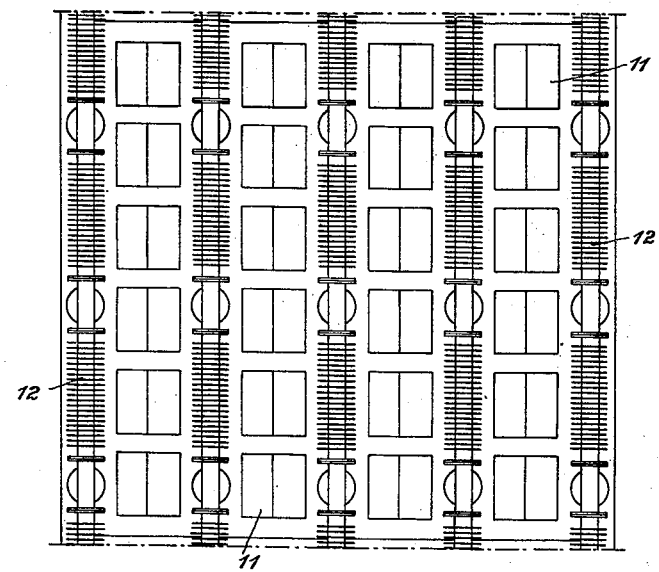
Figure 3:
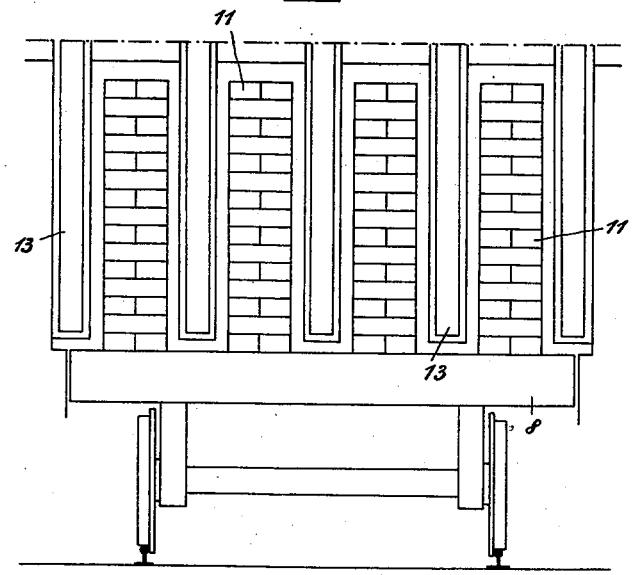
Figure 3A:
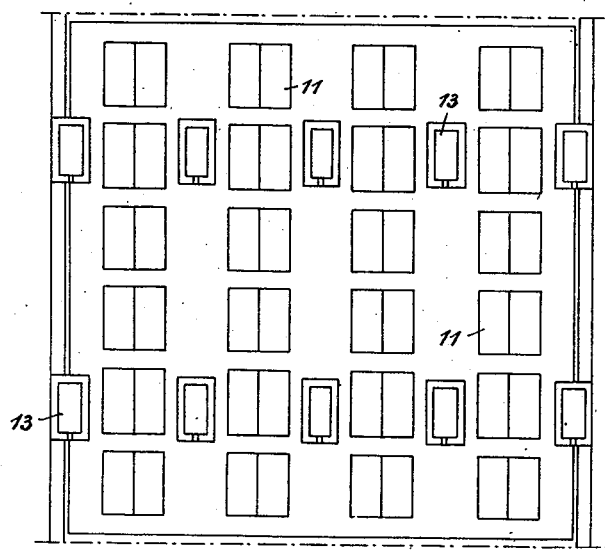
Figure 6:
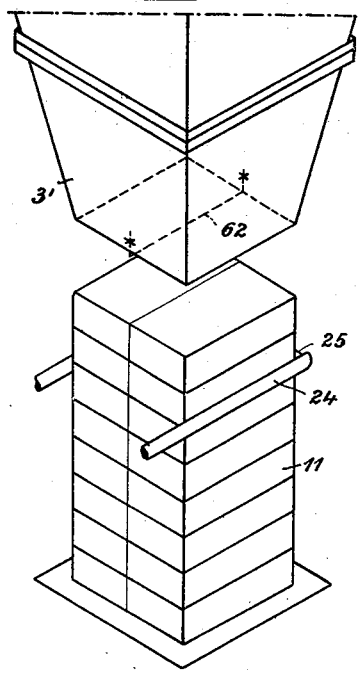
Figure 7:
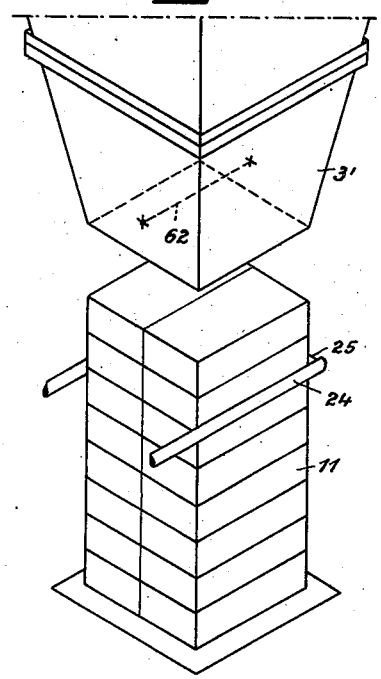
Figure 8:
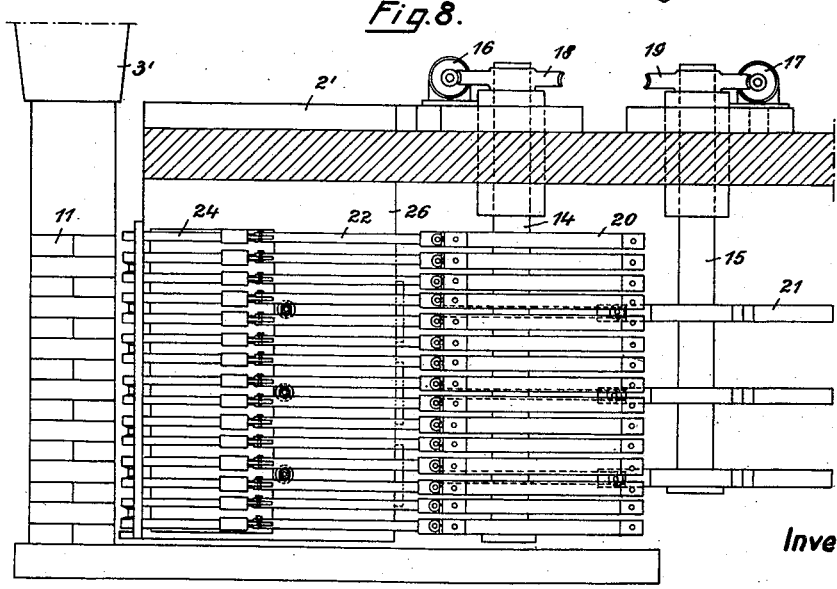

Fig. 1 is a side elevation of the press with the cutting device,

Figs. 2 and 2a show the charged carriage on its travel through the drying channel in end elevation and in top plan view, respectively, Figs. 3 and 3a show the same on the travel through the tunnel kiln, in end elevation and in top plan view respectively, Figs. 4 and 5 show diagrammatically the division of the pressed clay string with different cutting implements, Figs. 6 and 7 show two arrangements of the cutting wire for a continuous vertical separating-cut, Figs. 8 and 9 show an eccentric control of the cutting tools in side elevation and in cross-section, Fig. 10 shows in side elevation another cutting device, Fig. 11 shows details of the device shown in Fig. 10, Figs. 12 and 13 show two different constructions of a shield destined to support the clay string during the cutting, Fig. 14 shows one of the depositing devices in side elevation, Fig. 15 is an end view and Fig. 16 a top plan view of Fig. 14, Fig. 16a shows the run out cutting wires on larger scale, Fig. 17 shows in side elevation a second form of construction of the depositing device, Figs. 18 and 19 show each a mouthpiece with different outlet cross-section.

A frame, consisting of columns 1 and binders 2, encloses the cutting device with the plate car and carries the string press 3 with driving engine 4 and countershaft 5. The press 3 may be equipped with a ventilating arrangement. In a pit the longitudinal bed 6 and the transverse bed 7 are provided for the support on which the carriage 8 is standing. The cutting device 9 is mounted on the columns 1 and carries the electric eye 10. The cutting device and press are mutually arranged so that the discharged clay string 11 is directly in front of the cutting device. Fig. 1 shows in dash lines the position of the car plate with the staples of tiles on the same.

Figs. 2 and 3 show a charged plate-car which has come from the press and is run into the drying channel or into the channel-furnace viewed from the front and in top plan view respectively. In the drying channel ribbed heating tubes 12 are arranged in the longitudinal direction and in the channel furnace the gas pipes 13 hang down from the ceiling and extend between the longitudinal rows of the tile staples.

If the clay string has to be cut on its whole length into two or more vertical part-strings, a cutting wire 62 is fixed in front of the mouthpiece 3' of the press 3, said cutting wire producing the vertical cut shown in Figure 6. It is, however, especially practical to place the cutting wire 62, as shown in Fig. 7, in the interior of the mouthpiece 3' at a distance of a few millimeters from the outlet edge. Gaping of the two string halves is thus avoided.

The horizontal cuts are cut by means of horizontally moved cutting wires 25, which are stretched in a frame consisting of rods 24.

The individual bodies, however, can be cut in bond from the string, as shown in Figs. 4 and 5. In this instance the vertical wires may have one or two guiding needles. The one-needle wire 27 pierces the clay string in the middle of the two horizontal cuts. At the point of the needle a plate of sheet steel, approximately 10 mm. wide and 0.7 mm. thick, is riveted in a gap and sharpened on all edges.

The two-needle wire comprises two needles, the outermost ends of which are connected by a strip of sheet metal. The two needles pierce through the vertical clay string approximately 3 mm. above respectively below a horizontal cut. The connecting strip of sheet steel or the steel wire slightly projects beyond the needles. The cutting sheet metal strip may be so short, that about 1 mm. of the mass remains uncut. This edge tears only during drying, burning or loading of the whole staple.

Breaking out of portions of the mass can be avoided in that all cutters are not conducted through the whole string but begin the back cut already 1 mm. before they leave the string.

If from a string having a cross-section of 25 x 25 cm. normal tiles with a surface of 25 x 12 cm. must be cut, the vertical cutters are constructed as double knives, so that between the two juxtaposed tiles a waste strip of 1 cm. to 6.5 cm. high and 25 cm. long is cut out. This is for instance possible thereby that, between two slide rods, arranged at the point where the needles 27 are provided, two vertical cutting wires 43 are stretched at a distance of 1 cm., as shown in Fig. 5. It is, however, possible to cut by a wire or by a rib on the mouthpiece of the press a clay string of a cross-section of 25 x 24 cm. into two part-strings of 25 x 12 cm., and then it is merely necessary to produce the horizontal cuts by means of the cutting wires 25.

A mechanical splitting- or cutting arrangement for the production of separating cuts in the bond is shown in Figs. 8 and 10. On the carrier 2' shafts 14 and 15 are journalled and driven by worms 16 and 17 by means of worm wheels 18 and 19. Eccentrics 20, 21 and 21' mounted on the shafts 14, 15 and 15' have connecting rods 22, 23 and 23' which engage on the cutting tools proper.

Wires 25 stretched between the slide rods 24 serve for the production of the horizontal cuts. Needles 27 and 27' are guided in the frames 26 and 26', said needles carrying either pairwise one above the other a vertical cutting wire or they operate singly and have a vertical cutting knife for the vertical cuts.

According to this form of construction all horizontal cutters 25 operate first and then all vertical cutters 27 and 27' situated in one vertical plane operate at the same time.

A hydraulically actuated cutting device is shown in Figs. 10 and 11. The slide rods 24 with the cutting wires 25 and the needles 27 and 27' with the cutting tools for the vertical cuts are guided in the frame 26" and 26''' as in the device shown in Figs. 8 and 9. They are, however, mounted on piston rods 28 the pistons 29 of which are movable in cylinders 30. The front end of the cylinder is actually connected with the rear end of the cylinder below the first mentioned cylinder by an overflow pipe 31 or 32 respectively. The inflow pipe enters on the front end of the uppermost cylinder behind the piston. If the admission of pressure fluid is engaged, when the cutting wires are run out, the pressing medium first flows to in front of the uppermost piston, moves this piston towards the rear and produces the uppermost cut. If the piston 29 has arrived in the rearmost position, the pressure medium flows over through the pipe 31 to the next following cylinder in which the second piston is then moved forward and carries out the second cut, and so forth. The pistons operate in a similar manner for the cutting tools of the vertical cuts. The conduits 31' and 32' serve finally to return, with the aid of the pressing fluid discharged from the lowermost cylinder, the cutting tools of each group into the initial position, after the cut clay string has been removed from the range of the cutting tools.

The illustrated form of construction has the advantage that it works without a valve. The possibility exists, however, to provide overflow valves and branch conduits which, after in one cylinder a certain pressure has been attained, liberate the inlet for the pressure medium for the next following cylinder. The control may be adjusted so that the piston situated on a lower level begins to operate already when the operation of the preceding piston has been completed only partly. This can be attained thereby that the overflow apertures on the cylinders are displaced by a corresponding distance relative to the cylinder end.

In the magnetic cutting tool magnets are used for moving to and fro the cutting wires, which act by means of levers of corresponding transmission upon the guide rods of the cutting wires. When the cutting tools are actuated by ropes, these ropes are attached to the actuating rods of the cutting tools, and these ropes are loaded at the other end by weights. Gear engines may further be provided which act by pinions upon racks which actuate the cutting tools.

If all horizontal cutters operate simultaneously, a pressure is exerted upon the clay string which might lead to a slight alteration of the shape. To avoid this, a supporting shield may be provided as shown in Figs. 12 and 13.

According to Fig. 12 a vertical shield 63 is mounted in the frame 26 by means of a slidable rod 64, this slidable rod being located between the two slidable rods 25. The rod 64 is controlled by an eccentric 65 so that, after the clay string has descended onto the support, it moves the shield along the side face of the string. After the cutting has been carried out, the shield is pulled back by a rotation of the eccentric by 180°. The supporting shield has a lateral flange which ensures the accurate bearing against the clay string.

In the form of construction shown in Fig. 13 the shield 63 is mounted on rods 66 in the frame 26, said rope being controlled by springs 67. When the string is being discharged, the shield is in its extreme position, so that the string slides down directly along the shield. At the cutting of the string the shield is touched and then pulled back by the slide rods 24 at the moment when the cams 68, shown behind the cutting wire 25 on the head of the slide rod 24, strike against the shield.

In both instances the shield may have incisions, so that the cutting wires penetrate about 3 to 10 mm. into the shield or pass through the same, in order that the string is cut through completely.

A lifting device for the plate car 8 is shown in Fig. 1. Rails 33 are mounted on the bottom of the pit and the longitudinal bed 6 can be run on these rails by the motor 34 with the aid of a spindle drive 35. The longitudinal bed 6 carries rails 36 for the transverse bed 37 which in turn can be shifted by means of a spindle drive 38. The base plate 7 for the car 8 rests upon the transverse bed 37 by means of columns 39. The columns 39 and with the same the base plate 7 and the car 8 can be lifted and lowered with the aid of bevel wheel gears 40, 41 and worm gears 42.

In order to avoid that actually the whole plate car 8 with the already cut clay strings resting on the car be run to and fro and lifted and lowered, a separate device for receiving and depositing the individual clay strings may be provided according to Figs. 14 to 17.

In the apparatus shown in Figs. 14 to 16 the carrier 44 is arranged at the side of the string press 3 and guided by a roller 45 on the rail 46. Two counter-rollers 47 serve for securely guiding the carrier. In the carrier 44 the jib 48 is guided on a spindle 49. The jib can be shifted vertically by a certain distance by means of the spindle and of the hand wheel 50. The jib has two fingers 51 at its front end engaging into two grooves 52 of plate 53.

On the other side of the press the plate car 8 is provided onto which the cut clay strings 11 are placed by means of the supporting plates 53. The car can be run on the rails 54, so that after one row of staples has been deposited the car can be shifted for a certain distance to receive the next following row. The individual clay strings are in each row placed the one at the side of the other in that the depositing device 44, 48 is run on the rail 46 correspondingly far to the left. The plate-car may, however, rest on a bed adapted to be moved in lateral direction, similar as above described and shown in Fig. 1, so that the depositing device is run always over the same distance.

In front of and behind the press the cutting devices 55, 55' are arranged laterally relative to the track on which the depositing device is moved, the construction of these devices being substantially like that described with reference to Figs. 8 to 11. The cutting wires 25 and their guide rods 24, 24' are mounted alternately in the cutting devices 55, 55' so that the first, third and fifth cut and so forth are made for instance by the device 55, the second, fourth and sixth cut and so forth by the device 55' into the string 11 which is under the press.

In the form of construction shown in Fig. 17 the press, the depositing device and the plate car are arranged in a similar manner, only one cutting device 55 being, however, provided under the press, the cutting wires of this device operating all in a horizontal direction. For taking up the cutting pressure the supporting shield is provided, the construction of which can be seen from Figs. 12 and 13.

In this second form of construction a table 56 of similar construction as in the known socket pipe presses is provided, which is lifted and lowered by means of a rack 57. The table carries the depositing plate 53. The weight of the rack as well as of the table and of the depositing plate is balanced by a counter-weight 59 provided in the pit 58 and attached to the end of a rope 61 guided over the roller 60. The other end of the rope is attached to the lower end of rack 57.

The operation of this depositing device is substantially similar to the lifting device for the plate car. A string is first pressed out until the electric eye stops the press. The depositing plate 53 is then made to come into contact with the lower end face of the string. The string is cut and lowered together with the plate 53 by means of the spindle drive 49, 50, run onto the plate-car and deposited on the same. When the jib 48 slightly moves downwards the fingers 51 get off the depositing plate and the apparatus can be run back for receiving a fresh depositing plate and a fresh clay string.

The depositing plate of fire-brick or of any other material is placed on the table when the same is in the lowermost position so that the depositing device, which in this instance is run back even somewhat farther, can receive free from disturbance the plate with staple. The table and the depositing plate placed on the same are lifted up to under the rest of the string the cutting arms being run out. This is effected by an electromotor not shown. Rack and table are relieved for the greatest part by the counter-weight.

When the plate has been lifted so far that it slightly presses against the string rest or against the full discharge aperture of the mouthpiece, the rack-engine is cut out automatically. During the pressing out of the string and the loading of the table continuously increasing, the table is pressed down by the pressure of the press and the load of the string at the speed at which the string is discharged.

Instead of the electric eye, a switch or a contact may be actuated by the table, when the string has attained the prescribed length or the table has arrived at the suitable distance from the mouthpiece. When the string is hanging down freely it is, however, advisable to use the electric eye as control element for the driving engine of the press, as a bodily resistance in the form of a switch or the like to be overcome by the shapable and soft string would cause deformations in the string.

After the provided string length has been attained, the driving engine for the press is stopped and the cutting of the horizontal cuts has taken place, the depositing device works in the same manner as described relative to the apparatus shown in Figures 14 to 16. Before the lateral movement of the clay string the table 56 must, however, be lowered still deeper, in order to liberate the path for the jib arm 48.

Instead of the plate-cars shown in the drawing, single plates of metal, fire brick or the like may be employed for receiving the clay staples, these single plates being run into the drying chamber and into the burning chamber as sole and having grooves on the longitudinal sides into which engage ledges provided on the longitudinal walls of the oven. The grooves are of such width, that the plates can be lifted and slide freely over the ledges.

The burnt staples can be removed by simple grippers of known type and directly laded for transport. When the tiles or the like hang still together by burrs which have remained, they will easily separate during the relading into the storerooms or conveying cars.

The invention which has been described above by way of example for the production of bricks or tiles is suitable also for the obtention of other ceramic or other shaped bodies of any moldable masses, for instance for the production of wedge-shaped bodies. Two such forms of construction are illustrated in Figs. 18 and 19. In Fig. 18 the mouthpiece has a core 69, so that a hollow string is produced. By four cutting wires 70, 71, 72, 73 extending in the direction of the side edges of the core towards the outer walls of the mouthpiece, this hollow space is subdivided into four part spaces having the cross-section of a normal tile and which support each other. Hollow bricks and ceiling bricks of the most various shapes can also be produced by a mouthpiece of suitable shape.

Fig. 19 shows a mouthpiece having an outlet cross-section 74 of approximately S-shape and a cutting wire 75 obliquely arranged in the interior, so that a string is obtained which is subdivided into two part strings the cross-sections of which correspond to ring bricks. Evidently the shape of the supporting shield must be adapted to the supported surface of the clay string during the cutting of the horizontal cuts. The chemical character of the shapable material is of secondary importance for the method according to the invention. Any raw materials come into consideration which possess a sufficient stability the press strings and staples being accordingly shaped.

I claim:

1. A method for the production of prismatic ceramic bodies which comprises, discharging downwardly a column of clay or the like of predetermined length at periodically recurring intervals, subdividing each column into a plurality of superimposed prisms by cutting the same at a plurality of points and at right angles to the direction of discharge during the interval between its formation and the formation of a succeeding column, supporting the column during cutting, shifting the column downwardly and laterally after cutting to remove the subdivided area as a unit from the locus of cutting to make way for a subsequently formed column.

2. Apparatus for the manufacture of prismatic ceramic bodies comprising, means for periodically downwardly discharging clay in the form of a column of predetermined length, means for subdividing the formed column both parallel to and also at right angles to the direction of discharge, underlying means for supporting the column during subdivision, and means for moving said supporting means downwardly and laterally upon completion of said severing, whereby to remove the severed portion of the column from the remainder thereof and to displace said portion to make room for another column.

3. The method of producing prismatic ceramic bodies which comprises extruding a mass of clay or the like in a downward direction in the form of a column, bringing the column to rest upon a support, transversely severing the column at the point of extrusion, subdividing the column horizontally at a plurality of equidistantly spaced points, dividing each subdivision vertically, and drying the subdivided column.

4. The method of producing prismatic ceramic bodies which comprises extruding a mass of clay or the like in a downward direction in the form of a column, bringing the column to rest upon a support, transversely severing the column at the point of extrusion, subdividing the column into units horizontally at a plurality of equidistantly spaced points, dividing each such unit vertically, the division of each unit being at right angles to that of the adjacent unit, and finally drying the subdivided column.

5. The method of producing prismatic ceramic bodies which comprises extruding a mass of clay or the like in a downward direction in the form of a column, simultaneously subdividing the column longitudinally at substantially the point of extrusion, bringing the column to rest upon a support, transversely severing the column at the point of extrusion, subdividing the column horizontally at a plurality of equidistantly spaced points, and finally drying the subdivided column.

6. The method of producing prismatic ceramic bodies which comprises extruding a mass of clay or the like in a downward direction in the form of a column, bringing the column to rest upon a support, transversely severing the column at the point of extrusion, subdividing the column into units horizontally at a plurality of equidistantly spaced points, halving alternate units by cutting them from one side against support on the opposite side and halving the intermediate units by cutting them from one side at right angles to the direction of the first named cut and against support on the opposite side of the units being cut, and finally drying the column.

7. Apparatus for the production of prismatic ceramic bodies comprising means for the downward extrusion of a column of clay or the like, a horizontally movable support for receiving said column, means for severing the column approximately at the point of extrusion, means for dividing the column vertically and means for subdividing the column horizontally at a plurality of equidistantly spaced points.

8. Apparatus for the production of prismatic ceramic bodies comprising means for the downward extrusion of a column of clay or the like, a horizontally movable support for receiving said column, means for severing the column approximately at the point of extrusion, means for dividing the column into units horizontally at a plurality of equidistantly spaced points, vertical cutting means for halving alternate units, and separate vertical cutting means for halving the intermediate units.

WILHELM AVENHAUS.